United States Patent

Blöhbaum

[11] Patent Number: 5,805,468
[45] Date of Patent: Sep. 8, 1998

[54] METHOD AND APPARATUS FOR DETERMINING THE LIGHT TRANSIT TIME OVER A MEASUREMENT PATH ARRANGED BETWEEN A MEASURING APPARATUS AND A REFLECTING OBJECT

[75] Inventor: Frank Blöhbaum, Freiburg, Germany

[73] Assignee: Erwin Sick GmbH Optik-Elektronik, Waldkirch/Breisgau, Germany

[21] Appl. No.: 646,422

[22] Filed: May 7, 1996

[30] Foreign Application Priority Data

May 9, 1995 [DE] Germany .................. 195 17 001.6

[51] Int. Cl.⁶ .................. G04F 10/00; G01C 3/08
[52] U.S. Cl. .................. 364/569; 364/556; 364/561; 356/5
[58] Field of Search .................. 364/569, 561, 364/556; 356/4.01, 5.01, 5.06, 5; 359/109, 154, 161; 342/118, 134, 135, 159, 205; 73/861.28, 597; 367/98–99

[56] References Cited

U.S. PATENT DOCUMENTS

| | | | |
|---|---|---|---|
| 4,498,764 | 2/1985 | Bölkow et asl. ........................... | 356/5 |
| 4,523,289 | 6/1985 | Soma et al. ............................. | 364/569 |
| 4,576,047 | 3/1986 | Lauer et al. ............................ | 73/597 |
| 4,644,483 | 2/1987 | Lauer et al. ............................ | 364/569 |
| 4,699,508 | 10/1987 | Bölkow et al. ......................... | 342/135 |
| 4,787,252 | 11/1988 | Jacobson et al. ..................... | 73/861.28 |
| 4,899,144 | 2/1990 | Kyle ....................................... | 340/856 |
| 5,124,954 | 6/1992 | Hordijk ................................... | 367/99 |
| 5,179,286 | 1/1993 | Akasu ..................................... | 356/5 |
| 5,180,922 | 1/1993 | Hug ........................................ | 356/5 |
| 5,221,928 | 6/1993 | Dahl ....................................... | 342/205 |
| 5,353,228 | 10/1994 | Geiss et al. ........................... | 364/561 |

Primary Examiner—James P. Trammell
Assistant Examiner—Bryan Bui
Attorney, Agent, or Firm—Townsend and Townsend and Crew LLP

[57] ABSTRACT

The invention relates to a method for determining the light transit time along a measurement path arranged between a measuring apparatus and a reflecting object, wherein a light transmitter contained in the measuring apparatus sends a modulated light signal s(t) along the measurement path, which is received by a light receiver contained in the measuring apparatus, is converted into a received signal e(t), and is evaluated in the measuring apparatus, wherein the light signal s(t) to be transmitted is stored in the form of digital values in a transmitter memory; wherein the stored digital values are sequentially read out and supplied to a digital/analog converter acted on by a clock signal and controlling the light transmitter; wherein the received signal e(t) is supplied to an analog/digital converter acted on with the identical clock signal; wherein the values delivered by the analog/digital converter are deposited in a receiver memory; wherein a correlation function k(t) is formed between the signals s(t) and e(t) stored in the transmitter memory and in the receiver memory; and wherein the maximum $K_{max}=k(t_{max})$ of the correlation function k(t) is found, with $t_{max}$ corresponding to the transit time to be determined, and also to an apparatus for carrying out this method.

14 Claims, 7 Drawing Sheets

METHOD AND APPARATUS FOR DETERMINING THE LIGHT TRANSIT TIME OVER A MEASUREMENT PATH ARRANGED BETWEEN A MEASURING APPARATUS AND A REFLECTING OBJECT

FIELD OF THE INVENTION

The invention relates to a method for determining the light transit time over a measurement path arranged between a measuring apparatus and a reflecting object, wherein a light transmitter contained in the measuring apparatus sends a modulated light signal s(t) along the measurement path, which is received by a light receiver 4 contained in the measuring apparatus, is converted into a received signal e(t), and is evaluated in the measuring apparatus. The invention also relates to an apparatus for carrying out this method.

BACKGROUND OF THE INVENTION

Such methods and apparatus are used in distance measurements which calculate the distance to be found between the measurement apparatus and the reflecting object, or the length of the measurement path, from the light transit time along the measurement path.

In such methods and apparatus it is often problematic that a very accurate resolution must be achieved with comparatively large distances, with it additionally being necessary to observe the existing regulations with respect to the safety of the eyes, having regard to the radiative power that is used.

In order to satisfy the said requirements a high level of technical complexity is necessary in apparatus and methods in accordance with the prior art, which has a negative economic effect.

PRINCIPAL OBJECT OF THE INVENTION

It is an object of the present invention to so design a method and an apparatus of the initially named kind that a high resolution can be achieved with the lowest possible economical cost, while guaranteeing eye safety even at large distances.

SUMMARY OF THE INVENTION

This object is satisfied in accordance with the method of the invention in that the light signal s(t) to be transmitted is stored in the form of digital values in a transmitter memory; in that the stored digital values are sequentially read out and supplied to a digital/analog converter acted on by a clock signal and controlling the light transmitter; in that the received signal e(t) is supplied to an analog/digital converter acted on by the identical clock signal; in that the values delivered by the analog/digital converter are deposited in a receiver memory; in that a correlation function k(t) is formed between the signals s(t) and e(t) stored in the transmitter memory and in the receiver memory; and in that the maximum $K_{max}$ of $k(t_{max})$ of the correlation function k(t) is found, with $t_{max}$ corresponding to the transit time to be determined.

In accordance with the invention the digital/analog converter and the analog/digital converter are thus acted on synchronously by the identical clock signal, which has the consequence that, precisely whenever a digital value from the transmitter memory is converted into an analog value and transmitted by the light transmitter, the analog value delivered at the same instant from the light receiver is converted into a digital value and deposited in the receiver memory. As a consequence, after one transmitting and receiving cycle, signals of substantially the same curve-shape are present in the transmitter and receiver memories and, neglecting internal signal transit times, the received signal is shifted timewise relative to the transmitted signal by the light transit time along the measurement path, corresponding to a specific number of clock cycles.

In accordance with the invention the number of clock cycles corresponding to the light transit time is derived by forming a correlation function between the transmitter signal and the receiver signal and by finding its maximum. At the maximum of the correlation function the transmitter and receiver signals are shifted relative to one another to such an extent that their curves have a minimum spacing from one another or substantially overlap. This shift corresponds precisely to the light transit time or the number of clock cycles which have elapsed between the transmission and the reception of the signal.

In this manner the light transit time can be found with little computing effort using cost-favorable components without, for example, having to indulge in a greater optical complexity as in the prior art or without having to use a GHz counter.

The light signal to be transmitted can, for example, take the form of sequential rectangular pulse sequences, each of a predetermined time duration, and can have a comparatively large bandwidth. It is particularly advantageous if the duration of the pulse sequences that are used is as short as possible and if their bandwidth is selected to be as large as possible. When using rectangular pulse sequences, use can, for example, be made of Barker sequences, in particular of the length n=13.

A light signal transmission is preferably suppressed during the calculation of the light transit time from the transmitter and receiver signals, which takes place in the measurement apparatus. In this case a pulse sequence is transmitted and received shifted by the light transit time, whereupon the light transmitter is switched off and the calculation of the light transit time takes place. Thereafter the prescribed procedure starts anew.

In the latter case it is of advantage that one can operate with a relatively high radiative power without endangering the safety of the eyes because the light transmitter is not continuously operated but rather only in intervals. Through the increase in radiative power, which is achieved in this manner, the requirements on the low noise of the light receiver are reduced, which contributes to a further cost saving.

In order to enable the calculation of the said correlation function k(t), the transmitter signal and the receiver signal are respectively stored in the transmitter and receiver memories as a bipolar signal about the value 0. Since no bipolar signal can be delivered by the light receiver, the received signal is converted into a bipolar signal in a suitable manner before it is deposited in the receiver memory.

For specific applications a very high resolution is required with respect to the light transit time to be determined, which is not strongforwardly achievable when using analog to digital converters or digital to analog converters clocked with approximately 30 MHz, because the light transit time in this case could only be accurately determined to 33.3 ns. For range measurements in the centimeter range it is, however, necessary to achieve a time resolution of approximately 0.1 ns. This can be achieved in the context of the invention in a simple manner, in that a polynomial p(t) is determined, whose spacing from the correlation function k(t) in the region of $K_{max}$ is minimal and whose maximum $P_{max} = p(t_{max/pol})$ is determined, with $t_{max/pol}$ corresponding to the light transit time to be determined in place of $t_{max}$.

Three or more values of the correlation function $k(t)$ can be used for the polynomial calculation.

Problematic in the described method is the fact that signal transit times within the measurement apparatus lead to measurement errors. These can be eliminated by the insertion of a reference path, in which reference signals pass through identical or corresponding components to the measurement signals. In this case the light transit time corrected for measurement errors can be obtained by subtracting the signal transit time of the reference signal in the measurement apparatus from the sum of the light transit time and the measurement signal transit time in the measurement apparatus. In the preferred embodiment of the invention the light signal to be transmitted is, as a consequence, additionally transmitted from the light transmitter along a reference path of known or negligibly small length, and the difference of the light transit times over the measurement and reference paths is taken into account for the derivation of the length of measurement path, with these two light transit times being subjected to the measurement error of the signal transit times within the measurement apparatus and with this measurement error being eliminated by the said difference formation.

In the context of the method of the invention the radiative power of the light transmitter can be regulated to a predetermined average value, in particular to half the maximum power of the light transmitter, prior to transmitting a pulse sequence along the measurement path. The regulating function is preferably set out of operation during the transmission of a pulse sequence along the measurement path, in particular through the switching over of the time constant of a corresponding regulating circuit.

In a further preferred embodiment of the method of the invention one or more plausibility checks can take place after calculation of the light transit time and can be realized in different ways.

When a signal is selected for the light signal to be transmitted, with a shape such that the correlation function $k(t)$ which is found extends symmetrically to its maximum $K_{max}$ (e.g. Barker sequence with n=13), straight lines can be laid through the functional values $k(t_{max}-2)$ and $k(t_{max}-1)$ and also through the functional values $k(t_{max}+1)$ and $k(t_{max}+2)$ for the plausibility check, and the check is then made as to whether the difference of the gradients of the straight lines lies within a predetermined tolerance range.

Alternatively or additionally it is possible to carry out the plausibility check by determining the spacing, in particular the square of the spacing, of the polynomial $p(t)$ from derived values of the correlation function $k(t)$ in the region of the maximum $P_{max}$ and to check whether these values or the sum of these values lie within a predetermined tolerance range.

If, in this case, the received signal has a level which is too low, then the superimposed noise signal dominates, which leads to the received signal having a shape different from the shape of the transmitter signal and to the derived spacing values exceeding the preset tolerance range.

Finally, a determination can be made, as an addition or as an alternative to the plausibility check, of whether the maximum $K_{max}$ of the correlation $k(t)$ lies above a predetermined boundary value.

It is an advantage of the described plausibility tests that these operate amplitude-free, i.e. independently of the amplitude of the light signal that is to be transmitted.

If one or more of the plausibility checks leads to a negative result then a warning and/or control signal can be transmitted.

A possible embodiment of a measurement apparatus for carrying out the method of the invention has, for example, a transmitter memory for storing the light signal $s(t)$ to be transmitted in the form of digital values; a digital/analog converter acted on by the transmitter memory and controlling the light transmitter; an analog/digital converter acted on by the received signal $e(t)$; a receiver memory for storing the values delivered by the analog/digital converter; and a clock signal generator which respectively acts on the digital/analog converter and on the analog/digital converter with the identical clock signal; wherein the evaluation circuit is provided with means for the formation of a correlation function $k(t)$ between the signals $s(t)$ and $e(t)$ stored in the transmitter memory and in the receiver memory for determining the maximum $K_{max} = k(t_{max})$ of the correlation function $k(t)$ representing the transit time $t_{max}$ to be determined.

A reference light receiver, which can be coupled to the evaluation circuit, can preferably be arranged at the end of an additionally provided reference path. In this case it is, furthermore, possible to provide a change-over switch for the selective coupling of the light receiver and of the reference light receiver to the evaluation circuit.

The reference light receiver can be a component of a regulating circuit for regulating the current supplied to the light transmitter, and the regulating function of the regulating circuit can be switched on and off by a change of its time constant.

The method of the invention, or the above-described measurement apparatus, are preferably used in a reflection light barrier. In such reflection light barriers the light transmitter and light receiver are arranged in one housing and the light transmitted from the light receiver is reflected back on itself by a reflecting object and received by the light receiver.

A reflection light barrier of this kind always transmits a warning and control signal when the received radiative power falls below a predetermined level.

For specific applications, in particular in the area of safety technology, it is necessary to determine, in addition to the information concerning the level of the received signal power or the presence of an object in the region to be monitored, also the location of the reflected object, for example in order to recognize manipulations at the reflector.

The method of the invention or a corresponding apparatus can be used for the latter purpose in order to obtain information concerning the distance between the measurement apparatus and the reflecting object. The light transmitter and light receiver in this case satisfy a double function, since they are, on the one hand, used for the actual light barrier function and, on the other hand, for the measuring of the distance. This likewise contributes to cost reduction since the corresponding components in the apparatus only need to be present once.

DETAILED DESCRIPTION OF THE PREFERRED EXEMPLARY EMBODIMENTS

Figure 1:
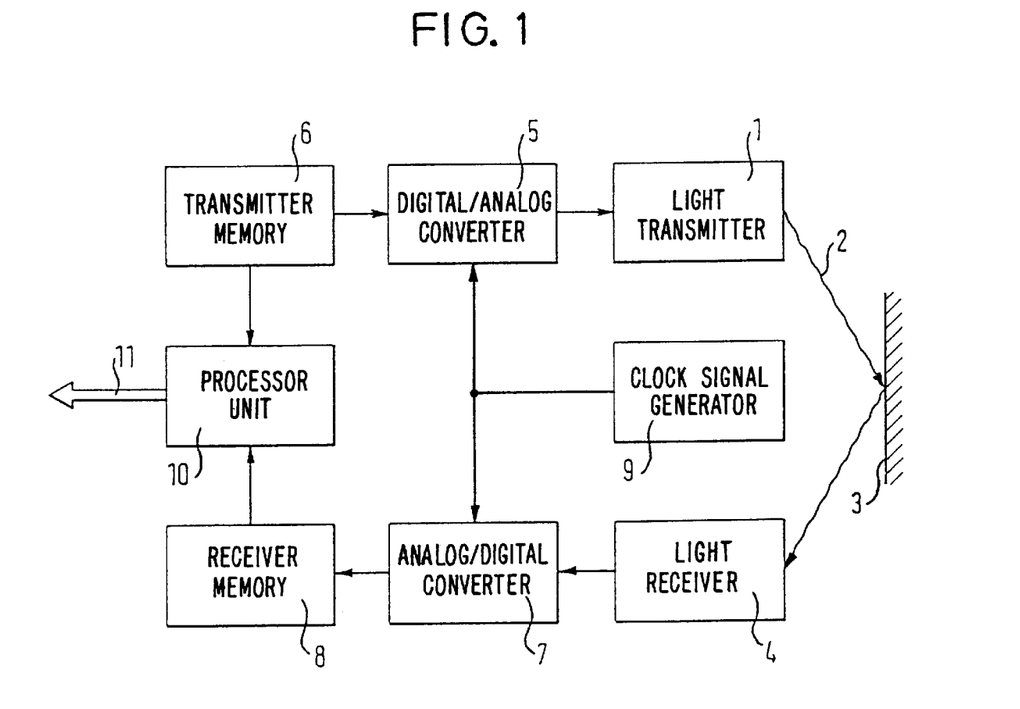
FIG. 1 is a block circuit diagram of an apparatus for carrying out the method of the invention.

The block circuit diagram illustrated in FIG. 1 shows a light transmitter 1, which transmits light 2 along a measurement path to a reflector 3, which in turn reflects the light back along the measurement path to a light receiver 4, with the light transmitter 1 and the light receiver 4 preferably being accommodated in a common housing.

The light transmitter 1 is acted on by a digital/analog converter 5 to which, in turn, digital values stored in a transmitter memory 6 are supplied.

The output signal of the light receiver 4 is supplied to an analog/digital converter 7, which generates corresponding digital values and deposits these in a receiver memory 8.

The digital/analog converter 5 and the analog/digital converter 7 are operated synchronously and are acted on by a common clock signal, which is generated by a clock signal generator 9.

The digital signals stored in the transmitter memory 6 and in the receiver memory 8 are called up by a processor unit 10, which calculates the light transit time of the light along the measurement path from these signals and makes this light transit time available for further processing via an output 11.

The described arrangement operates as follows:

The pulse sequence having pulses and pulse intervals of different widths, which is stored in the transmitter memory 6 as a digital signal, is converted by the digital/analog converter 5 into an analog signal, which is applied to a light transmitter 1, which is preferably formed as a laser diode.

The sequence of light pulses, which is generated in this manner, is radiated along the measurement path in the direction of the reflector 3, which reflects the light pulse sequence back along the measurement path to the light receiver 4 in the reverse direction.

The light receiver 4 generates a corresponding electrical signal, amplifies this, if necessary, by means of additional amplifier components, and leads it to the analog/digital converter 7, which converts the received signal into a sequence of digital values, which are then stored in turn in the receiver memory 8.

With undisturbed reflection and not taking account of any disturbing signals, which may eventually occur, a sequence of light pulses of the same shape is present in the transmitter memory (6) and in the receiver memory (8) after one transmitter/receiver cycle, and these signals of the same shape are shifted timewise relative to one another as a result of the light transit time along the measurement path and also as a result of internal signal transit times.

The processor unit (10) calculates a correlation function between the signals stored in the transmitter and receiver memories (6, 8), i.e. in each case the sum of the products of oppositely disposed supporting position values of the two signals is calculated and stored whereupon the signals stored in the transmitter memory are displaced by a sensing interval or by a functional value and the said sum is again calculated and stored. This procedure is repeated often until all values of the correlation function calculated in this manner are present. The number of the shifting, product and sum formation steps depends on the frequency of the clock signal generator (9) and on the length of the measurement path.

Thereafter the maximum of the calculated correlation function is determined, which is characteristic for the relative shift of the two signals at which the signals are superimposed as well as possible. The position of this maximum then characterizes the sum of the light transit time and the signal transit times in the measurement apparatus.

The signal transit times in the measurement apparatus represent measurement errors, which can, for example, be eliminated in a manner which will subsequently be described.

Figure 2:
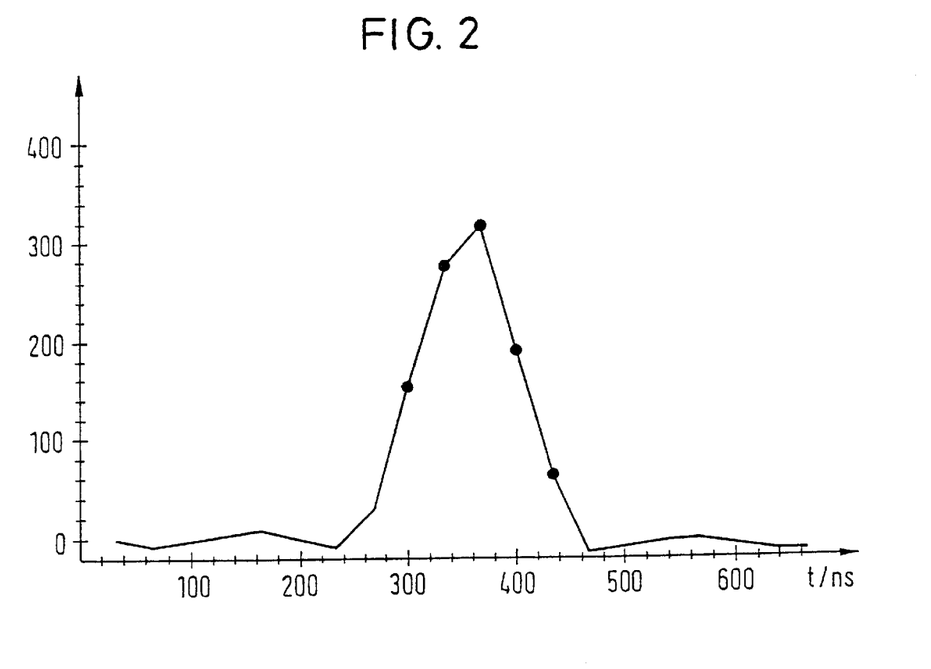
FIG. 2 is a correlation function formed in accordance with the invention.

FIG. 2 shows a section from a calculated correlation function between the transmitter and receiver signals.

Five supporting values of the correlation function are emphasized in FIG. 2, with the middle one of these five values representing the maximum.

It can be read off from the time axis of the correlation function, which characterizes the time shift of the transmitter signal and the receiver signal relative to one another, that the maximum of the correlation function lies at approximately 370 ns, with this value corresponding to the transit time to be derived.

Figure 3:
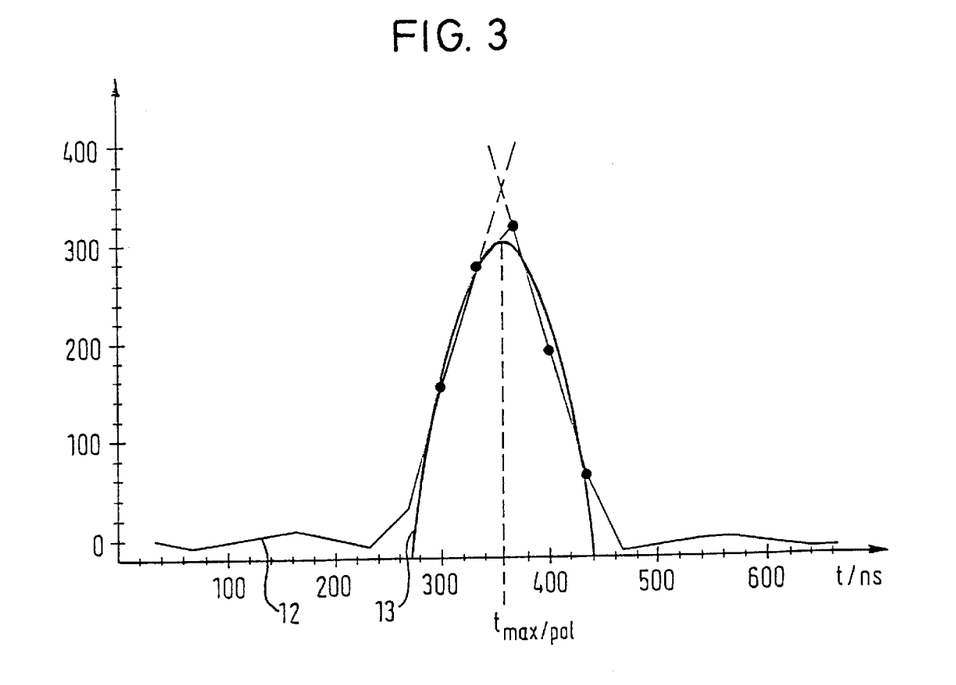
FIG. 3 is a correlation function in accordance with the invention approximated by a polynomial.

If the transit time calculated via the determination of the maximum of the correlation function cannot be calculated with adequate accuracy in certain applications in the described manner, then the correlation function can be approximated by a polynomial in the already described manner, as is illustrated in FIG. 3.

The correlation function 12 is approximated by the polynomial 13 and the maximum of the polynomial 13 ($t_{max/pol}$) is now used as the maximum representing the light transit time rather than the middle one of the five illustrated supporting values of the correlation function 12.

Three or more functional values of the correlation function can be used for the calculation of the polynomial, and noise filtering can be achieved by an over-determination of the polynomial.

The maximum of the polynomial can thereby lie between the sensing time points, which determine the supporting values of the correlation function, whereby the desired increase of the resolution is ultimately achieved.

The resolution can, in this way, be increased many times relative to the method described in connection with FIG. 2, without additional hardware requirements having to be provided for this, since the increase in the resolution is exclusively achieved by the calculation of the polynomial and its maximum, which is in any event straightforwardly possible with the components present in the measurement apparatus.

Figure 4:
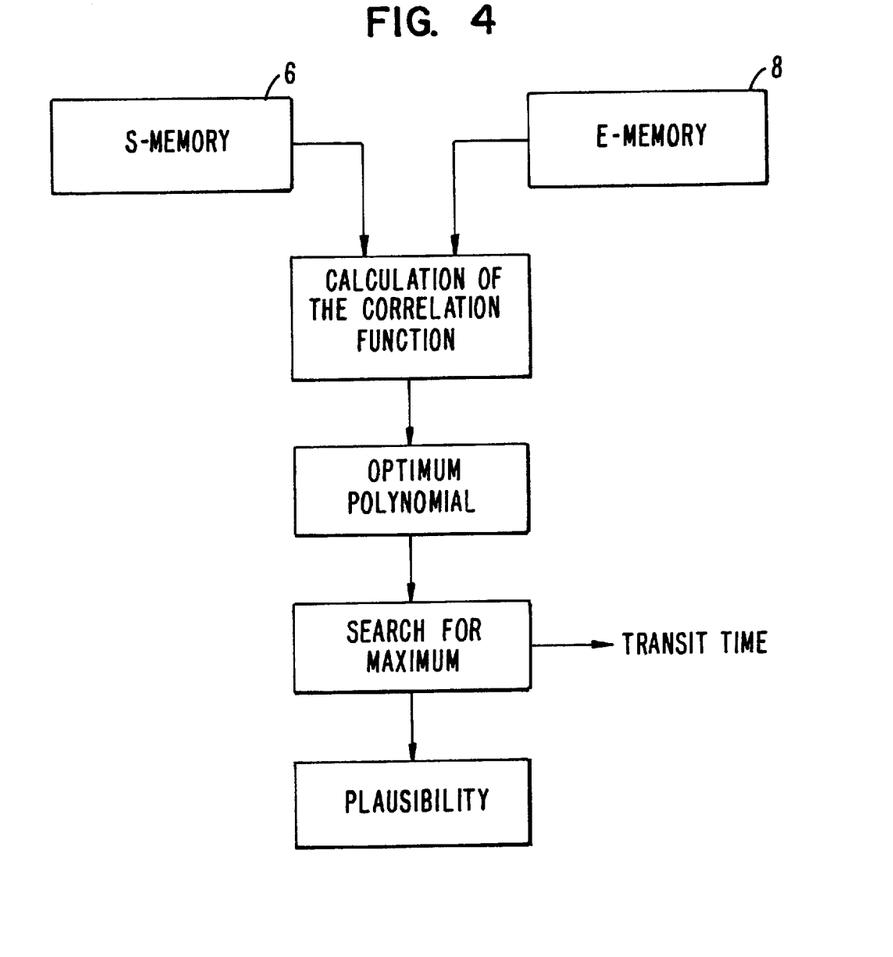
FIG. 4 is a flow diagram for the calculation of the light transit time.

FIG. 4 shows the described calculation steps once again in the form of a flow diagram.

The correlation function is calculated from the signals stored in the transmitter memory 6 and in the receiver memory 8, whereupon, in the subsequent step, a polynomial which is ideally approximated to this correlation function, is determined.

Thereafter the maximum of this polynomial is determined, the position of which is characteristic for the transit time to be determined.

A plausibility check can optionally take place after the determination of the maximum and here various methods are possible as already described above.

Figure 5:
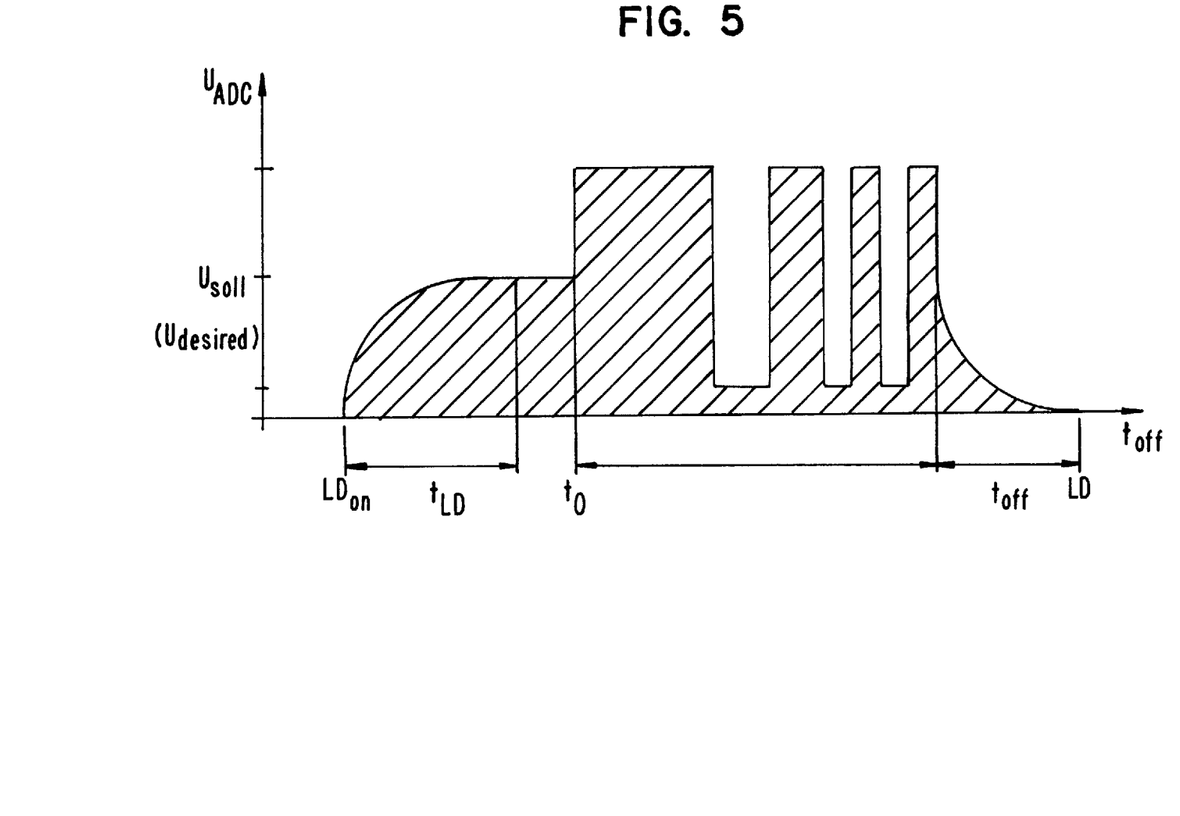
FIG. 5 is a possible shape of a sequence of light pulses transmitted in a method in accordance with the invention.

The time course of a light pulse sequence transmitted by the light transmitter 1 is represented in FIG. 5.

At the start of the time sequence the light transmitter, which is, for example, formed as a laser diode, is switched on at the start of the time duration $t_{LD}$ and the light signal transmitted by it is regulated to its desired value $U_{soll}$.

The desired value $U_{soll}$ should be selected so that either
a) this desired value is fixed and corresponds to the maximum permissible permanent power of the laser diode and thus the light power transmitted by the laser diode remains constant over temperature and with aging, or
b) this desired value is variable and is continuously corrected in dependence on the attenuation along the measurement or reference paths while observing the boundary values prescribed by the manufacturer so that the output signal of the light receiver or the input signal of the subsequent analog/digital converter is set to a value which corresponds to the MSB/2 of the analog/digital converter.

In this manner the working range of the analog/digital converter is ideally exploited and the best possible resolution of the received signal is achieved.

In the case a) of a fixed desired value $U_{soll}$ a specific input signal is set at the analog/digital converter in dependence on the attenuation of the measurement path and the amplification prior to the analog/digital converter. The analog/digital converter and its periphery are so connected that an analog or digital clamping is effected to this input level in such a way that a value of MSB/2 of the analog/digital converter arises at the digital side.

The transmission of the light pulse sequence, which starts at the time point $t_0$ after a transient process, then causes the analog/digital converter to sense an alternating voltage related to MSB/2.

In order to have a bipolar signal about the value 0 available for the further signal processing, in particular for the calculation of the correlation function, the signal generated by the A/D converter is normed in the digital space in such a way that MSB/2 is substracted from all derived signal values.

Since the input signal of the analog/digital converter is normed after the transient build-up of the transmitter in such a way that it corresponds to MSB/2 and a norming of the received signal into a bipolar signal around the value 0 takes place, fluctuations of the received radiative power are eliminated, which could, for example, occur through temperature variations or through attenuation on the measurement path as a consequence of variation of distance or contamination of the reflector.

After the described transient build-ups and the subsequent norming, the pulse sequence required for the actual measurement is transmitted. The pulse sequence as illustrated in FIG. 5 corresponds to a Barker sequence with n=13.

After the transmission of this pulse sequence the light transmitter is switched off, whereupon the radiative power emitted by the light transmitter sinks to the value 0 within the time interval $t_{aus}$.

Figure 6:
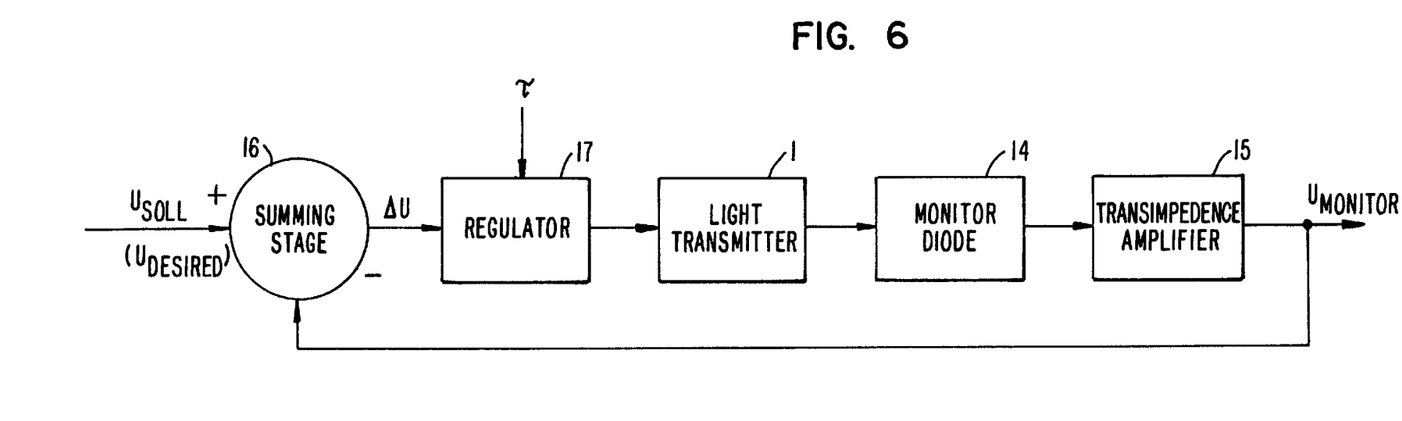
FIG. 6 is a block circuit diagram of the regulating circuit for the setting of the radiative power of a light transmitter.

In a preferred embodiment of the method of the invention the light radiated by the light transmitter 1 in accordance with FIG. 6 is not transmitted via the measurement path to the light receiver but rather via a measurement path to a monitored diode 14, which is arranged in the same housing as the light transmitter 1, and the light receiver, which is not shown in FIG. 6.

The monitor diode 14 delivers a photocurrent, which follows the radiation generated by the light transmitter 1. This photocurrent is supplied to a transimpedance amplifier 15, which delivers a voltage at its output, which follows the radiation generated by the light transmitter 1 and changes in the cycle of the light pulses.

The output signal of the transimpedance amplifier 15 is supplied with a reversed sign to a summing stage 16 and a voltage desired value $U_{soll}$ is present with a positive sign at the other input of the summing stage.

The output signal of the summing stage 16, which corresponds to the difference between $U_{soll}$ and the output signal of the transimpedance amplifier 15, is supplied to a regulator 17, having the time constant $\tau$.

The components shown in FIG. 6 form a regulating circuit for the current, which controls the light transmitter 1.

This regulating circuit is optimized in such a way that it has a minimum transient build-up time, in order to keep the regulating process characterized in FIG. 5 with $t_{LD}$, and thus the total measurement time which is required, as short as possible.

After the described regulation process the time constant of the regulating circuit of FIG. 6 is switched over to a very large value, whereby the regulating function is set out of operation. As a consequence, no further regulation then takes place during the measurement process following the transient build-up process.

Figure 7:
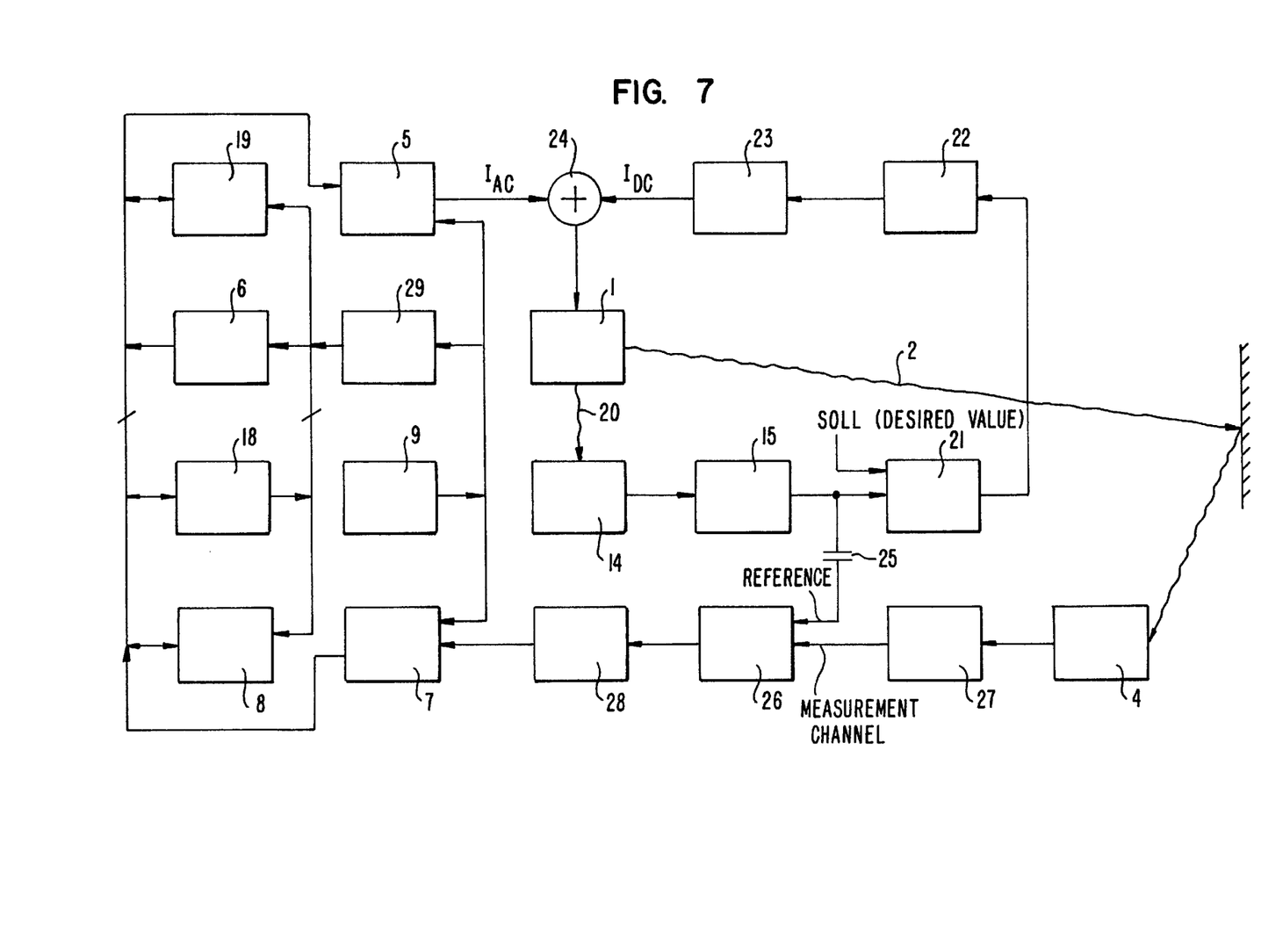
FIG. 7 is a block circuit diagram of a preferred embodiment of an apparatus for carrying out the method of the invention.

FIG. 7 shows a detailed embodiment of an apparatus for carrying out the method of the invention using a regulating circuit in accordance with FIG. 6 and a reference branch to eliminate internal signal transit times.

The digital image of the pulse sequence to be transmitted is stored at defined addresses in a non-volatile memory 6, which can, for example, be executed as a FRAM or EPROM.

The content of the memory 6 is transferred by the signal processor unit 18 into a very rapid RAM 19, whereupon the signal processor unit 18 switches on the light transmitter 1 formed as a laser diode with the aid of a corresponding control signal.

Thereafter the regulating circuit described in the following is activated.

A reference signal 20 transmitted by the light transmitter 1 is received by the monitor diode 14 and supplied to the transimpedance amplifier 15.

The output of the transimpedance amplifier 15 is coupled to an amplifier and filter component 21 to which a desired value is supplied at the same time, which is characteristic for the mean control voltage of the light transmitter 1.

The output of the amplifier and filter component 21 is connected to the input of a track & hold stage 22, which acts on a voltage controllable current source 23.

The output of the current source 23 is connected to one input of the summing stage 24, the output of which acts on the light transmitter 1.

The regulating circuit consisting of the components 1, 20, 14, 15, 21, 22, 23 and 24 is set in operation prior to the actual measurement process through the switching on of the light transmitter 1 and regulates the radiated power transmitted by the light transmitter 1 to a predeterminable and adjustable desired value. During this regulating process the track & hold stage 22 is in the track mode.

The output of the transimpedance amplifier 15 is connected via a capacitor 25, which filters out alternating voltage components, to one input of a change-over switch 26, the other input of which is acted on by the output signal of a further transimpedance amplifier 27, to which the output signal of the light receiver 4 is, in turn, supplied.

The change-over switch 26 has two switch positions, of which one is characterized with "reference" and the other with "measurement channel". In the switch position "reference", the output of the transimpedance amplifier 15 of the described regulating circuit as filtered by the capacitor 25 is present at the output of the change-over switch 26; whereas, in the switch position "measurement channel", the output of the transimpedance amplifier 27 acted on by the light receiver 4 is switched through to the output of the change-over switch 26.

During the transit build-up and regulating process of the control current for the light transmitter 1, the radiation 2 transmitted by the light transmitter 1 along the measurement path is received by the light receiver 4 in the switch position "measurement channel" of the change-over switch 26, is converted into a photocurrent and is supplied to the transimpedance amplifier 27, which converts this current into a voltage, which reaches an amplifier 28 via the change-over switch 26, and is supplied to the analog/digital converter 7. The amplifier 28 placed in front of the analog/digital converter 7 amplifies the voltage applied to it in such a way that the analog/digital converter 7 is ideally controlled over its entire working range.

After the control current of the light transmitter 1 and thus also the voltage level at the input of the analog/digital converter 7 has gone through the transient phase, the input stage of the analog/digital converter 7 is clamped to the voltage value applied to it in such a way that the analog/digital converter 7 delivers a digital value MSB/2. In this way the regulating and transient process is terminated, whereupon the track & hold stage 22 is switched to "hold", which corresponds to an increase of the time constant of the described regulation circuit, and thus to a switching off of the regulation function.

Thus the current delivered by the current source 23 remains constant during the subsequent measurement process.

At the start of the actual measurement process a state-machine 29 and the clock generator 9 are activated.

As already described the clock signal generator 9 synchronously clocks the digital/analog converter 5 and the analog/digital converter 7 with the identical clock signal in each case.

The state-machine 29 counts up the address bus of the receiver memory 8 and of the RAM 19. During this time the digital/analog converter 5 converts the data words corresponding to the respective addresses into an analog signal $I_{AC}$ and the analog/digital converter 7 simultaneously writes the sensed receiver signal into the receiver memory 8.

During the transmission of the actual measurement signal 2 the control current of the light transmitter 1 comprises the sum of the current $I_{AC}$ delivered by the digital/analog converter 5 and of the current $I_{DC}$ delivered from the current source 23.

After all signal values of the RAM 19 have been read out or after the state-machine 29 has reached its end count state, the current, which controls the light transmitter 1, is switched off.

As a consequence the signal processing unit 18 calculates the actual transit time in the above-described manner from the memory contents of the RAM 19 and of the receiver memory 8.

Thereafter a plausibility check can take place.

The reference measurement takes place in corresponding manner, when the change-over switch 26 is located in the switch position "reference".

After the transient build-up period and the clamping process of the analog/digital converter 7, which is now related to the monitor diode 14, the light transmitter now sends a light signal 20 along the reference path to the monitor diode 14.

The output signal of the monitor diode 14 is supplied via the transimpedance amplifier 15 to the amplifier 28 while coupling out the DC component of the capacitor 25, with the intermediate change-over switch 26 being so laid out that the damping between the switched on and switched off signal corresponds at least to the maximum damping in the measurement channel.

The signal delivered by the amplifier 28 during the reference measurement is stored analogously to the measurement procedure in the receiver memory 8, whereupon the transit time along the reference path can be calculated.

This reference transit time is then subtracted from the transit time derived during the actual measurement process, whereby the result obtained in relation to the measurement path is freed from the internal signal transit times of the measurement apparatus.

In order to keep the systematic error, which originates from the physically non-identical transimpedance amplifiers 15 and 27 present in the reference and measurement channels, as small as possible, these amplifiers are laid out with the same bandwidth, which is considerably greater than the signal bandwidth. In addition, it is of advantage when both transimpedance amplifiers 15, 27 are present on the same chip.

When using the described apparatus or the method of the invention, statistical errors can be reduced if several measurements are carried out in sequence and an average value is subsequently calculated.

As a further plausibility test the measured values determined after the average value computation can, in this case, be compared with the calculated average value, and on deviation from a specified tolerance range, a warning and control signal can be transmitted.

Alternatively, the described reference branch can also be so executed that an additional photodiode is provided, which is suitable for detecting the surface reflex of the laser optical system. The photocurrent generated by the reflex light is then converted into a voltage and supplied to the change-over switch 26, which is responsible for the change-over between the measurement and the reference paths. In this case the monitor diode 14, including the described regulating circuit, would, however, remain present; its function would in this case be exclusively restricted only to the monitoring or determination of the working point of the laser diode or of the light transmitter 1.

What is claimed is:

1. A method for determining the light transit time along a measurement path arranged between a measuring apparatus and a reflecting object, wherein a light transmitter contained in the measuring apparatus sends a modulated light signal s(t) along the measurement path, which is received by a light receiver contained in the measuring apparatus, is converted into a received signal e(t) and is evaluated in the measuring apparatus, wherein the light signal s(t) to be transmitted is stored in the form of digital values in a transmitter memory; wherein the stored digital values are sequentially read out and supplied to a digital/analog converter acted on by a clock signal and controlling the light transmitter; wherein the received signal e(t) is supplied to an analog/digital converter acted on by the identical clock signal; wherein the values delivered by the analog/digital converter are deposited in a receiver memory; wherein a correlation function k(t) is formed between the signals s(t) and e(t) stored in the transmitter memory and in the receiver memory; wherein a maximum $K_{max}=k(t_{max})$ of the correlation function k(t) is found; and wherein a polynomial p(t) is derived, the spacing of which from the correlation function k(t) in the region of $K_{max}$ is a minimum, and whose maximum $P_{max}=p(t_{max/pol})$ is determined, with $t_{max/pol}$ to the transit time to be determined.

2. Method in accordance with claim 1, wherein rectangular pulse sequences each of predetermined time duration and greater bandwidth are used as the light signal s(t) to be transmitted.

3. Method in accordance with claim 2, wherein Barker sequences, in particular of the length n=13, are used as the rectangular pulse sequences.

4. Method in accordance with claim 1, wherein the transmission of a light signal is suppressed during the calculation of the light transit time from the signals s(t) and e(t) in the measuring apparatus.

5. Method in accordance with claim 1, wherein the signal s(t) and/or e(t) is converted prior to calculation of the correlation function k(t) into a bipolar signal around the value 0.

6. Method in accordance with claim 1, wherein three or more values of k(t) are used for the polynomial calculation.

7. Method in accordance with claim 1, wherein the light signal to be transmitted by the light transmitter is additionally transmitted via a reference path of known length or of negligibly small length, and the difference of the light transit times via the measurement and reference paths is taken into account for the calculation of the length of the measurement path.

8. Method in accordance with claim 1, wherein the radiative power of the light transmitter is regulated prior to transmitting a pulse sequence along the measurement path to a predetermined average value, in particular to half the maximum power of the light transmitter.

9. Method in accordance with claim 8, wherein the regulating function is set out of operation during the transmission of a pulse sequence along the measurement path, in particular through the switching over of the time constant of a corresponding regulating circuit.

10. Method in accordance with claim 1, wherein for the light signal to be transmitted a signal is selected of a shape so that the correlation function k(t), which is derived, extends symmetrically to its maximum $K_{max}$.

11. Method in accordance with claim 10, wherein for a plausibility check straight lines are laid through the functional values $k(t_{max}-2)$ and $k(t_{max}-1)$ and also through the functional values $k(t_{max}+1)$ and $k(t_{max}+2)$ and a check is made whether the difference of their gradients lies within a predetermined tolerance range.

12. Method in accordance with claim 1, wherein for a plausibility check the spacing, in particular the square of the spacing, of the polynomial p(t) from the derived values of the correlation function k(t) in the region of the maximum $P_{max}$ is determined and a check is made whether these values or the sum of these values lie within a preset tolerance range.

13. Method in accordance with claim 1, wherein for a plausibility check a determination is made whether the maximum $K_{max}$ of the correlation function k(t) lies above a predetermined threshold value.

14. Use of a method in accordance with claim 1 in a reflection light barrier.

* * * * *